United States Patent
Xu et al.

(10) Patent No.: US 10,230,770 B2
(45) Date of Patent: Mar. 12, 2019

(54) NETWORK PROXY LAYER FOR POLICY-BASED APPLICATION PROXIES

(71) Applicant: A10 NETWORKS, INC., San Jose, CA (US)

(72) Inventors: Feilong Xu, San Jose, CA (US); Chih-Wei Chao, Saratoga, CA (US); Lee Chen, Saratoga, CA (US)

(73) Assignee: A10 Networks, Inc., San Jose, CA (US)

( * ) Notice: Subject to any disclaimer, the term of this patent is extended or adjusted under 35 U.S.C. 154(b) by 151 days.

(21) Appl. No.: 14/094,529

(22) Filed: Dec. 2, 2013

(65) Prior Publication Data
US 2015/0156223 A1   Jun. 4, 2015

(51) Int. Cl.
*H04L 29/06*   (2006.01)
*H04L 29/08*   (2006.01)

(52) U.S. Cl.
CPC ........ *H04L 65/105* (2013.01); *H04L 65/1069* (2013.01); *H04L 67/141* (2013.01)

(58) Field of Classification Search
None
See application file for complete search history.

(56) References Cited

U.S. PATENT DOCUMENTS

| | | |
|---|---|---|
| 5,218,602 A | 6/1993 | Grant et al. |
| 5,774,660 A | 6/1998 | Brendel et al. |
| 5,862,339 A | 1/1999 | Bonnaure et al. |
| 5,875,185 A | 2/1999 | Wang et al. |
| 5,935,207 A | 8/1999 | Logue et al. |
| 5,941,988 A * | 8/1999 | Bhagwat ............... H04L 69/16 726/12 |
| 5,958,053 A | 9/1999 | Denker |
| 5,995,981 A | 11/1999 | Wikstrom |

(Continued)

FOREIGN PATENT DOCUMENTS

| | | |
|---|---|---|
| CN | 1372662 A | † 10/2002 |
| CN | 1408089 | 4/2003 |

(Continued)

OTHER PUBLICATIONS

Cardellini et al., "Dynamic Load Balancing on Web-server Systems", IEEE Internet Computing, vol. 3, No. 3, pp. 28-39, May-Jun. 1999.

(Continued)

*Primary Examiner* — Viet D Vu
(74) *Attorney, Agent, or Firm* — Keith Kline; The Kline Law Firm PC

(57) ABSTRACT

A system and method for providing a network proxy layer are disclosed. The network proxy layer may receive a connection establishment event for a client connection of an application session and send the client connection event to an application proxy for the application session, the application proxy being associated with an application of a server. Upon establishment of the client connection, the network proxy layer may receive one or more data packets from the client connection. The network proxy layer may further receive a connection establishment event for a server connection of the application session of the server, and receive one or more data packets from the server connection.

32 Claims, 8 Drawing Sheets

(56) References Cited

U.S. PATENT DOCUMENTS

| | | | |
|---|---|---|---|
| 6,003,069 A | 12/1999 | Cavill | |
| 6,014,700 A * | 1/2000 | Bainbridge | G06F 9/505 |
| | | | 709/226 |
| 6,047,268 A | 4/2000 | Bartoli et al. | |
| 6,075,783 A | 6/2000 | Voit | |
| 6,131,163 A * | 10/2000 | Wiegel | H04L 63/0245 |
| | | | 726/12 |
| 6,219,706 B1 | 4/2001 | Fan et al. | |
| 6,259,705 B1 | 7/2001 | Takahashi et al. | |
| 6,321,338 B1 | 11/2001 | Porras et al. | |
| 6,374,300 B2 | 4/2002 | Masters | |
| 6,456,617 B1 | 9/2002 | Oda et al. | |
| 6,459,682 B1 | 10/2002 | Ellesson et al. | |
| 6,483,600 B1 | 11/2002 | Schuster et al. | |
| 6,535,516 B1 | 3/2003 | Leu et al. | |
| 6,578,066 B1 | 6/2003 | Logan et al. | |
| 6,587,866 B1 | 7/2003 | Modi et al. | |
| 6,600,738 B1 | 7/2003 | Alperovich et al. | |
| 6,658,114 B1 | 12/2003 | Farn et al. | |
| 6,748,414 B1 | 6/2004 | Bournas | |
| 6,772,205 B1 | 8/2004 | Lavian et al. | |
| 6,772,334 B1 | 8/2004 | Glawitsch | |
| 6,779,017 B1 | 8/2004 | Lamberton et al. | |
| 6,779,033 B1 | 8/2004 | Watson et al. | |
| 6,804,224 B1 | 10/2004 | Schuster et al. | |
| 6,877,036 B1 * | 4/2005 | Smith | H04L 69/16 |
| | | | 709/202 |
| 6,952,728 B1 | 10/2005 | Alles et al. | |
| 7,010,605 B1 | 3/2006 | Dharmarajan | |
| 7,013,482 B1 | 3/2006 | Krumel | |
| 7,058,718 B2 | 6/2006 | Fontes et al. | |
| 7,069,438 B2 | 6/2006 | Balabine et al. | |
| 7,076,555 B1 | 7/2006 | Orman et al. | |
| 7,143,087 B2 | 11/2006 | Fairweather | |
| 7,167,927 B2 | 1/2007 | Philbrick et al. | |
| 7,181,524 B1 | 2/2007 | Lele | |
| 7,218,722 B1 | 5/2007 | Turner et al. | |
| 7,228,359 B1 | 6/2007 | Monteiro | |
| 7,234,161 B1 | 6/2007 | Maufer et al. | |
| 7,236,457 B2 | 6/2007 | Joe | |
| 7,254,133 B2 | 8/2007 | Govindarajan et al. | |
| 7,269,850 B2 | 9/2007 | Govindarajan et al. | |
| 7,277,963 B2 | 10/2007 | Dolson et al. | |
| 7,293,099 B1 * | 11/2007 | Kalajan | G06F 17/30067 |
| | | | 709/203 |
| 7,301,899 B2 | 11/2007 | Goldstone | |
| 7,308,499 B2 | 12/2007 | Chavez | |
| 7,310,686 B2 | 12/2007 | Uysal | |
| 7,328,267 B1 | 2/2008 | Bashyam et al. | |
| 7,334,232 B2 | 2/2008 | Jacobs et al. | |
| 7,337,241 B2 | 2/2008 | Boucher et al. | |
| 7,343,399 B2 | 3/2008 | Hayball et al. | |
| 7,349,970 B2 | 3/2008 | Clement et al. | |
| 7,370,353 B2 | 5/2008 | Yang | |
| 7,373,500 B2 | 5/2008 | Ramelson et al. | |
| 7,391,725 B2 | 6/2008 | Huitema et al. | |
| 7,398,317 B2 | 7/2008 | Chen et al. | |
| 7,423,977 B1 | 9/2008 | Joshi | |
| 7,430,755 B1 | 9/2008 | Hughes et al. | |
| 7,463,648 B1 | 12/2008 | Eppstein et al. | |
| 7,467,202 B2 | 12/2008 | Savchuk | |
| 7,472,190 B2 | 12/2008 | Robinson | |
| 7,492,766 B2 | 2/2009 | Cabeca et al. | |
| 7,506,360 B1 | 3/2009 | Wilkinson et al. | |
| 7,509,369 B1 | 3/2009 | Tormasov | |
| 7,512,980 B2 | 3/2009 | Copeland et al. | |
| 7,533,409 B2 | 5/2009 | Keane et al. | |
| 7,552,323 B2 | 6/2009 | Shay | |
| 7,584,262 B1 | 9/2009 | Wang et al. | |
| 7,584,301 B1 | 9/2009 | Joshi | |
| 7,590,736 B2 | 9/2009 | Hydrie et al. | |
| 7,610,622 B2 | 10/2009 | Touitou et al. | |
| 7,613,193 B2 | 11/2009 | Swami et al. | |
| 7,613,822 B2 | 11/2009 | Joy et al. | |
| 7,673,072 B2 | 3/2010 | Boucher et al. | |
| 7,675,854 B2 | 3/2010 | Chen et al. | |
| 7,703,102 B1 | 4/2010 | Eppstein et al. | |
| 7,707,295 B1 | 4/2010 | Szeto et al. | |
| 7,711,790 B1 | 5/2010 | Barrett et al. | |
| 7,733,866 B2 | 6/2010 | Mishra et al. | |
| 7,747,748 B2 | 6/2010 | Allen | |
| 7,765,328 B2 | 7/2010 | Bryers et al. | |
| 7,792,113 B1 | 9/2010 | Foschiano et al. | |
| 7,808,994 B1 | 10/2010 | Vinokour et al. | |
| 7,826,487 B1 | 11/2010 | Mukerji et al. | |
| 7,881,215 B1 | 2/2011 | Daigle et al. | |
| 7,948,952 B2 | 5/2011 | Hurtta et al. | |
| 7,965,727 B2 | 6/2011 | Sakata et al. | |
| 7,970,934 B1 | 6/2011 | Patel | |
| 7,979,694 B2 | 7/2011 | Touitou et al. | |
| 7,983,258 B1 | 7/2011 | Ruben et al. | |
| 7,990,847 B1 | 8/2011 | Leroy et al. | |
| 7,991,859 B1 | 8/2011 | Miller et al. | |
| 7,992,201 B2 | 8/2011 | Aldridge et al. | |
| 8,019,870 B1 | 9/2011 | Eppstein et al. | |
| 8,032,634 B1 | 10/2011 | Eppstein et al. | |
| 8,081,640 B2 | 12/2011 | Ozawa et al. | |
| 8,090,866 B1 | 1/2012 | Bashyam et al. | |
| 8,099,492 B2 | 1/2012 | Dahlin et al. | |
| 8,116,312 B2 | 2/2012 | Riddoch et al. | |
| 8,122,116 B2 | 2/2012 | Matsunaga et al. | |
| 8,151,019 B1 | 4/2012 | Le et al. | |
| 8,179,809 B1 | 5/2012 | Eppstein et al. | |
| 8,185,651 B2 | 5/2012 | Moran et al. | |
| 8,191,106 B2 | 5/2012 | Choyi et al. | |
| 8,224,971 B1 | 7/2012 | Miller et al. | |
| 8,261,339 B2 | 9/2012 | Aldridge et al. | |
| 8,296,434 B1 | 10/2012 | Miller et al. | |
| 8,312,507 B2 | 11/2012 | Chen et al. | |
| 8,379,515 B1 | 2/2013 | Mukerji | |
| 8,499,093 B2 | 7/2013 | Grosser et al. | |
| 8,539,075 B2 | 9/2013 | Bali et al. | |
| 8,554,929 B1 | 10/2013 | Szeto et al. | |
| 8,559,437 B2 | 10/2013 | Mishra et al. | |
| 8,560,693 B1 | 10/2013 | Wang et al. | |
| 8,584,199 B1 | 11/2013 | Chen et al. | |
| 8,595,791 B1 | 11/2013 | Chen et al. | |
| RE44,701 E | 1/2014 | Chen et al. | |
| 8,675,488 B1 | 3/2014 | Sidebottom et al. | |
| 8,681,610 B1 | 3/2014 | Mukerji | |
| 8,750,164 B2 | 6/2014 | Casado et al. | |
| 8,782,221 B2 | 7/2014 | Han | |
| 8,813,180 B1 | 8/2014 | Chen et al. | |
| 8,826,372 B1 | 9/2014 | Chen et al. | |
| 8,879,427 B2 | 11/2014 | Krumel | |
| 8,885,463 B1 | 11/2014 | Medved et al. | |
| 8,897,154 B2 | 11/2014 | Jalan et al. | |
| 8,965,957 B2 | 2/2015 | Barros | |
| 8,977,749 B1 | 3/2015 | Han | |
| 8,990,262 B2 | 3/2015 | Chen et al. | |
| 9,094,364 B2 | 7/2015 | Jalan et al. | |
| 9,106,561 B2 | 8/2015 | Jalan et al. | |
| 9,154,584 B1 | 10/2015 | Han | |
| 9,215,275 B2 | 12/2015 | Kannan et al. | |
| 9,219,751 B1 | 12/2015 | Chen et al. | |
| 9,253,152 B1 | 2/2016 | Chen et al. | |
| 9,270,705 B1 | 2/2016 | Chen et al. | |
| 9,270,774 B2 | 2/2016 | Jalan et al. | |
| 9,338,225 B2 | 5/2016 | Jalan et al. | |
| 9,350,744 B2 | 5/2016 | Chen et al. | |
| 9,356,910 B2 | 5/2016 | Chen et al. | |
| 9,386,088 B2 | 7/2016 | Zheng et al. | |
| 2001/0042200 A1 | 11/2001 | Lamberton et al. | |
| 2001/0049741 A1 | 12/2001 | Skene et al. | |
| 2002/0026515 A1 | 2/2002 | Michielsens et al. | |
| 2002/0032777 A1 | 3/2002 | Kawata et al. | |
| 2002/0032799 A1 | 3/2002 | Wiedeman et al. | |
| 2002/0078164 A1 | 6/2002 | Reinschmidt | |
| 2002/0091844 A1 | 7/2002 | Craft et al. | |
| 2002/0103916 A1 | 8/2002 | Chen et al. | |
| 2002/0133491 A1 | 9/2002 | Sim et al. | |
| 2002/0138618 A1 | 9/2002 | Szabo | |
| 2002/0141386 A1 | 10/2002 | Minert et al. | |
| 2002/0143991 A1 | 10/2002 | Chow et al. | |

(56) References Cited

U.S. PATENT DOCUMENTS

| | | | |
|---|---|---|---|
| 2002/0152307 A1* | 10/2002 | Doyle | G06F 9/505 709/225 |
| 2002/0178259 A1 | 11/2002 | Doyle et al. | |
| 2002/0188678 A1 | 12/2002 | Edecker et al. | |
| 2002/0191575 A1 | 12/2002 | Kalavade et al. | |
| 2002/0194335 A1 | 12/2002 | Maynard | |
| 2002/0194350 A1 | 12/2002 | Lu et al. | |
| 2003/0009591 A1 | 1/2003 | Hayball et al. | |
| 2003/0014544 A1 | 1/2003 | Pettey | |
| 2003/0023711 A1 | 1/2003 | Parmar et al. | |
| 2003/0023873 A1 | 1/2003 | Ben-Itzhak | |
| 2003/0035409 A1 | 2/2003 | Wang et al. | |
| 2003/0035420 A1 | 2/2003 | Niu | |
| 2003/0061506 A1 | 3/2003 | Cooper et al. | |
| 2003/0091028 A1 | 5/2003 | Chang et al. | |
| 2003/0131245 A1 | 7/2003 | Linderman | |
| 2003/0135625 A1 | 7/2003 | Fontes et al. | |
| 2003/0195962 A1 | 10/2003 | Kikuchi et al. | |
| 2004/0010545 A1 | 1/2004 | Pandya | |
| 2004/0062246 A1 | 4/2004 | Boucher et al. | |
| 2004/0073703 A1 | 4/2004 | Boucher et al. | |
| 2004/0078419 A1 | 4/2004 | Ferrari et al. | |
| 2004/0078480 A1 | 4/2004 | Boucher et al. | |
| 2004/0103315 A1 | 5/2004 | Cooper et al. | |
| 2004/0111516 A1 | 6/2004 | Cain | |
| 2004/0128312 A1 | 7/2004 | Shalabi et al. | |
| 2004/0139057 A1 | 7/2004 | Hirata et al. | |
| 2004/0139108 A1 | 7/2004 | Tang et al. | |
| 2004/0141005 A1 | 7/2004 | Banatwala et al. | |
| 2004/0143599 A1 | 7/2004 | Shalabi et al. | |
| 2004/0187032 A1 | 9/2004 | Gels et al. | |
| 2004/0199616 A1 | 10/2004 | Karhu | |
| 2004/0199646 A1 | 10/2004 | Susai et al. | |
| 2004/0202182 A1 | 10/2004 | Lund et al. | |
| 2004/0210623 A1 | 10/2004 | Hydrie et al. | |
| 2004/0210663 A1 | 10/2004 | Phillips et al. | |
| 2004/0213158 A1 | 10/2004 | Collett et al. | |
| 2004/0250059 A1 | 12/2004 | Ramelson et al. | |
| 2005/0005207 A1 | 1/2005 | Herneque | |
| 2005/0009520 A1 | 1/2005 | Herrero et al. | |
| 2005/0021848 A1 | 1/2005 | Jorgenson | |
| 2005/0027862 A1 | 2/2005 | Nguyen et al. | |
| 2005/0036501 A1 | 2/2005 | Chung et al. | |
| 2005/0036511 A1 | 2/2005 | Baratakke et al. | |
| 2005/0039033 A1 | 2/2005 | Meyers et al. | |
| 2005/0044270 A1 | 2/2005 | Grove et al. | |
| 2005/0074013 A1 | 4/2005 | Hershey et al. | |
| 2005/0080890 A1 | 4/2005 | Yang et al. | |
| 2005/0102400 A1 | 5/2005 | Nakahara et al. | |
| 2005/0125276 A1 | 6/2005 | Rusu | |
| 2005/0163073 A1 | 7/2005 | Heller et al. | |
| 2005/0198335 A1 | 9/2005 | Brown et al. | |
| 2005/0213586 A1 | 9/2005 | Cyganski et al. | |
| 2005/0240989 A1 | 10/2005 | Kim et al. | |
| 2005/0249225 A1 | 11/2005 | Singhal | |
| 2005/0259586 A1 | 11/2005 | Hatid et al. | |
| 2005/0281190 A1 | 12/2005 | McGee et al. | |
| 2006/0023721 A1 | 2/2006 | Miyake et al. | |
| 2006/0036610 A1 | 2/2006 | Wang | |
| 2006/0036733 A1 | 2/2006 | Fujimoto et al. | |
| 2006/0041745 A1 | 2/2006 | Parnes | |
| 2006/0064478 A1 | 3/2006 | Sirkin | |
| 2006/0069774 A1 | 3/2006 | Chen et al. | |
| 2006/0069804 A1 | 3/2006 | Miyake et al. | |
| 2006/0077926 A1 | 4/2006 | Rune | |
| 2006/0092950 A1 | 5/2006 | Arregoces et al. | |
| 2006/0098645 A1 | 5/2006 | Walkin | |
| 2006/0112170 A1 | 5/2006 | Sirkin | |
| 2006/0164978 A1 | 7/2006 | Werner et al. | |
| 2006/0168319 A1 | 7/2006 | Trossen | |
| 2006/0187901 A1 | 8/2006 | Cortes et al. | |
| 2006/0190997 A1 | 8/2006 | Mahajani et al. | |
| 2006/0209789 A1 | 9/2006 | Gupta et al. | |
| 2006/0230129 A1 | 10/2006 | Swami et al. | |
| 2006/0233100 A1 | 10/2006 | Luft et al. | |
| 2006/0251057 A1 | 11/2006 | Kwon et al. | |
| 2006/0277303 A1 | 12/2006 | Hegde et al. | |
| 2006/0280121 A1 | 12/2006 | Matoba | |
| 2007/0019543 A1 | 1/2007 | Wei et al. | |
| 2007/0022479 A1 | 1/2007 | Sikdar et al. | |
| 2007/0076653 A1 | 4/2007 | Park et al. | |
| 2007/0086382 A1 | 4/2007 | Narayanan et al. | |
| 2007/0094396 A1 | 4/2007 | Takano et al. | |
| 2007/0118881 A1 | 5/2007 | Mitchell et al. | |
| 2007/0124502 A1 | 5/2007 | Li | |
| 2007/0156919 A1 | 7/2007 | Potti et al. | |
| 2007/0165622 A1 | 7/2007 | O'Rourke et al. | |
| 2007/0180119 A1 | 8/2007 | Khivesara et al. | |
| 2007/0185998 A1 | 8/2007 | Touitou et al. | |
| 2007/0195792 A1 | 8/2007 | Chen et al. | |
| 2007/0230337 A1 | 10/2007 | Igarashi et al. | |
| 2007/0242738 A1 | 10/2007 | Park et al. | |
| 2007/0243879 A1 | 10/2007 | Park et al. | |
| 2007/0245090 A1† | 10/2007 | King | |
| 2007/0248009 A1 | 10/2007 | Petersen | |
| 2007/0259673 A1 | 11/2007 | Willars et al. | |
| 2007/0283429 A1 | 12/2007 | Chen et al. | |
| 2007/0286077 A1 | 12/2007 | Wu | |
| 2007/0288247 A1 | 12/2007 | Mackay | |
| 2007/0294209 A1 | 12/2007 | Strub et al. | |
| 2008/0016161 A1 | 1/2008 | Tsirtsis et al. | |
| 2008/0031263 A1 | 2/2008 | Ervin et al. | |
| 2008/0076432 A1 | 3/2008 | Senarath et al. | |
| 2008/0101396 A1 | 5/2008 | Miyata | |
| 2008/0109452 A1 | 5/2008 | Patterson | |
| 2008/0109554 A1* | 5/2008 | Jing | H04L 12/14 709/230 |
| 2008/0109870 A1 | 5/2008 | Sherlock et al. | |
| 2008/0120129 A1 | 5/2008 | Seubert et al. | |
| 2008/0134332 A1 | 6/2008 | Keohane et al. | |
| 2008/0162679 A1 | 7/2008 | Maher et al. | |
| 2008/0225722 A1 | 9/2008 | Khemani et al. | |
| 2008/0228781 A1 | 9/2008 | Chen et al. | |
| 2008/0250099 A1 | 10/2008 | Shen et al. | |
| 2008/0253390 A1 | 10/2008 | Das et al. | |
| 2008/0263209 A1 | 10/2008 | Pisharody et al. | |
| 2008/0271130 A1 | 10/2008 | Ramamoorthy | |
| 2008/0282254 A1 | 11/2008 | Blander et al. | |
| 2008/0291911 A1 | 11/2008 | Lee et al. | |
| 2008/0298303 A1 | 12/2008 | Tsirtsis | |
| 2009/0024722 A1 | 1/2009 | Sethuraman et al. | |
| 2009/0031415 A1 | 1/2009 | Aldridge et al. | |
| 2009/0049198 A1 | 2/2009 | Blinn et al. | |
| 2009/0070470 A1 | 3/2009 | Bauman et al. | |
| 2009/0077651 A1 | 3/2009 | Poeluev | |
| 2009/0092124 A1 | 4/2009 | Singhal et al. | |
| 2009/0106830 A1 | 4/2009 | Maher | |
| 2009/0138606 A1 | 5/2009 | Moran et al. | |
| 2009/0138945 A1 | 5/2009 | Savchuk | |
| 2009/0141634 A1 | 6/2009 | Rothstein et al. | |
| 2009/0164614 A1 | 6/2009 | Christian et al. | |
| 2009/0172093 A1 | 7/2009 | Matsubara | |
| 2009/0213858 A1 | 8/2009 | Dolganow et al. | |
| 2009/0222583 A1 | 9/2009 | Josefsberg et al. | |
| 2009/0227228 A1 | 9/2009 | Hu et al. | |
| 2009/0228547 A1 | 9/2009 | Miyaoka et al. | |
| 2009/0262741 A1 | 10/2009 | Jungck et al. | |
| 2009/0271472 A1 | 10/2009 | Scheifler et al. | |
| 2009/0285196 A1 | 11/2009 | Lee et al. | |
| 2009/0313379 A1 | 12/2009 | Rydnell et al. | |
| 2010/0008229 A1 | 1/2010 | Bi et al. | |
| 2010/0023621 A1 | 1/2010 | Ezolt et al. | |
| 2010/0036952 A1 | 2/2010 | Hazlewood et al. | |
| 2010/0054139 A1 | 3/2010 | Chun et al. | |
| 2010/0061319 A1 | 3/2010 | Aso et al. | |
| 2010/0064008 A1 | 3/2010 | Yan et al. | |
| 2010/0082787 A1 | 4/2010 | Kommula et al. | |
| 2010/0083076 A1 | 4/2010 | Ushiyama | |
| 2010/0094985 A1 | 4/2010 | Abu-Samaha et al. | |
| 2010/0095018 A1 | 4/2010 | Khemani et al. | |
| 2010/0098417 A1 | 4/2010 | Tse-Au | |
| 2010/0106833 A1 | 4/2010 | Banerjee et al. | |
| 2010/0106854 A1 | 4/2010 | Kim et al. | |
| 2010/0128606 A1 | 5/2010 | Patel et al. | |

(56) References Cited

U.S. PATENT DOCUMENTS

| | | |
|---|---|---|
| 2010/0162378 A1 | 6/2010 | Jayawardena et al. |
| 2010/0205310 A1 | 8/2010 | Altshuler et al. |
| 2010/0210265 A1 | 8/2010 | Borzsei et al. |
| 2010/0217793 A1 | 8/2010 | Preiss |
| 2010/0217819 A1 | 8/2010 | Chen et al. |
| 2010/0223630 A1 | 9/2010 | Degenkolb et al. |
| 2010/0228819 A1 | 9/2010 | Wei |
| 2010/0235507 A1 | 9/2010 | Szeto et al. |
| 2010/0235522 A1 | 9/2010 | Chen et al. |
| 2010/0235880 A1 | 9/2010 | Chen et al. |
| 2010/0238828 A1 | 9/2010 | Russell |
| 2010/0265824 A1 | 10/2010 | Chao et al. |
| 2010/0268814 A1 | 10/2010 | Cross et al. |
| 2010/0293296 A1 | 11/2010 | Hsu et al. |
| 2010/0312740 A1 | 12/2010 | Clemm et al. |
| 2010/0318631 A1 | 12/2010 | Shukla |
| 2010/0322252 A1 | 12/2010 | Suganthi et al. |
| 2010/0330971 A1 | 12/2010 | Selitser et al. |
| 2010/0333101 A1 | 12/2010 | Pope et al. |
| 2011/0007652 A1 | 1/2011 | Bai |
| 2011/0019550 A1 | 1/2011 | Bryers et al. |
| 2011/0023071 A1 | 1/2011 | Li et al. |
| 2011/0029599 A1 | 2/2011 | Pulleyn et al. |
| 2011/0032941 A1 | 2/2011 | Quach et al. |
| 2011/0040826 A1 | 2/2011 | Chadzelek et al. |
| 2011/0047294 A1 | 2/2011 | Singh et al. |
| 2011/0060831 A1 | 3/2011 | Ishii et al. |
| 2011/0083174 A1 | 4/2011 | Aldridge et al. |
| 2011/0093522 A1 | 4/2011 | Chen et al. |
| 2011/0099403 A1 | 4/2011 | Miyata et al. |
| 2011/0099623 A1 | 4/2011 | Garrard et al. |
| 2011/0110294 A1 | 5/2011 | Valluri et al. |
| 2011/0145324 A1 | 6/2011 | Reinart et al. |
| 2011/0149879 A1 | 6/2011 | Noriega et al. |
| 2011/0153834 A1 | 6/2011 | Bharrat |
| 2011/0178985 A1 | 7/2011 | San Martin Arribas et al. |
| 2011/0185073 A1 | 7/2011 | Jagadeeswaran et al. |
| 2011/0191773 A1 | 8/2011 | Pavel et al. |
| 2011/0196971 A1 | 8/2011 | Reguraman et al. |
| 2011/0276695 A1 | 11/2011 | Maldaner |
| 2011/0276982 A1 | 11/2011 | Nakayama et al. |
| 2011/0289496 A1 | 11/2011 | Steer |
| 2011/0292939 A1 | 12/2011 | Subramaian et al. |
| 2011/0302256 A1 | 12/2011 | Sureshehandra et al. |
| 2011/0307541 A1 | 12/2011 | Walsh et al. |
| 2012/0008495 A1 | 1/2012 | Shen et al. |
| 2012/0023231 A1 | 1/2012 | Ueno |
| 2012/0026897 A1 | 2/2012 | Guichard et al. |
| 2012/0030341 A1 | 2/2012 | Jensen et al. |
| 2012/0066371 A1 | 3/2012 | Patel et al. |
| 2012/0084419 A1 | 4/2012 | Kannan et al. |
| 2012/0084460 A1 | 4/2012 | McGinnity et al. |
| 2012/0106355 A1 | 5/2012 | Ludwig |
| 2012/0117382 A1 | 5/2012 | Larson et al. |
| 2012/0117571 A1 | 5/2012 | Davis et al. |
| 2012/0144014 A1 | 6/2012 | Natham et al. |
| 2012/0144015 A1 | 6/2012 | Jalan et al. |
| 2012/0151353 A1 | 6/2012 | Joanny |
| 2012/0170548 A1 | 7/2012 | Rajagopalan et al. |
| 2012/0173759 A1 | 7/2012 | Agarwal et al. |
| 2012/0191839 A1 | 7/2012 | Maynard |
| 2012/0215910 A1 | 8/2012 | Wada |
| 2012/0239792 A1 | 9/2012 | Banerjee et al. |
| 2012/0240185 A1 | 9/2012 | Kapoor et al. |
| 2012/0290727 A1 | 11/2012 | Tivig |
| 2012/0297046 A1 | 11/2012 | Raja et al. |
| 2013/0046876 A1 | 2/2013 | Narayana et al. |
| 2013/0058335 A1 | 3/2013 | Koponen et al. |
| 2013/0074177 A1 | 3/2013 | Varadhan et al. |
| 2013/0083725 A1 | 4/2013 | Mallya et al. |
| 2013/0100958 A1 | 4/2013 | Jalan et al. |
| 2013/0124713 A1 | 5/2013 | Feinberg et al. |
| 2013/0135996 A1 | 5/2013 | Torres et al. |
| 2013/0136139 A1 | 5/2013 | Zheng et al. |
| 2013/0148500 A1 | 6/2013 | Sonoda et al. |
| 2013/0166762 A1 | 6/2013 | Jalan et al. |
| 2013/0173795 A1 | 7/2013 | McPherson |
| 2013/0176854 A1 | 7/2013 | Chisu et al. |
| 2013/0191486 A1 | 7/2013 | Someya et al. |
| 2013/0198385 A1 | 8/2013 | Han et al. |
| 2013/0250765 A1 | 9/2013 | Ehsan et al. |
| 2013/0258846 A1 | 10/2013 | Damola |
| 2013/0282791 A1 | 10/2013 | Kruglick |
| 2014/0012972 A1 | 1/2014 | Han |
| 2014/0089500 A1 | 3/2014 | Sankar et al. |
| 2014/0164617 A1 | 6/2014 | Jalan et al. |
| 2014/0169168 A1 | 6/2014 | Jalan et al. |
| 2014/0207845 A1 | 7/2014 | Han et al. |
| 2014/0258465 A1 | 9/2014 | Li |
| 2014/0258536 A1 | 9/2014 | Chiong |
| 2014/0269728 A1 | 9/2014 | Jalan et al. |
| 2014/0286313 A1 | 9/2014 | Fu et al. |
| 2014/0298091 A1 | 10/2014 | Carlen et al. |
| 2014/0330982 A1 | 11/2014 | Jalan et al. |
| 2014/0334485 A1 | 11/2014 | Jain et al. |
| 2014/0359052 A1† | 12/2014 | Joachimpillai |
| 2015/0039671 A1 | 2/2015 | Jalan et al. |
| 2015/0215436 A1 | 7/2015 | Kancherla |
| 2015/0237173 A1 | 8/2015 | Virkki et al. |
| 2015/0244566 A1 | 8/2015 | Puimedon |
| 2015/0281087 A1 | 10/2015 | Jalan et al. |
| 2015/0281104 A1 | 10/2015 | Golshan et al. |
| 2015/0296058 A1 | 10/2015 | Jalan et al. |
| 2015/0312092 A1 | 10/2015 | Golshan et al. |
| 2015/0312268 A1 | 10/2015 | Ray |
| 2015/0333988 A1 | 11/2015 | Jalan et al. |
| 2015/0334086 A1* | 11/2015 | Zhao .................. H04L 67/1002 714/4.11 |
| 2015/0350048 A1 | 12/2015 | Sampat et al. |
| 2015/0350379 A1 | 12/2015 | Jalan et al. |
| 2016/0014052 A1 | 1/2016 | Han |
| 2016/0014126 A1 | 1/2016 | Jalan et al. |
| 2016/0036778 A1 | 2/2016 | Chen et al. |
| 2016/0042014 A1 | 2/2016 | Jalan et al. |
| 2016/0043901 A1 | 2/2016 | Sankar et al. |
| 2016/0044095 A1 | 2/2016 | Sankar et al. |
| 2016/0050233 A1 | 2/2016 | Chen et al. |
| 2016/0088074 A1 | 3/2016 | Kannan et al. |
| 2016/0105395 A1 | 4/2016 | Chen et al. |
| 2016/0105446 A1 | 4/2016 | Chen et al. |
| 2016/0119287 A1* | 4/2016 | Khazan ............... H04L 63/0428 726/12 |
| 2016/0119382 A1 | 4/2016 | Chen et al. |
| 2016/0139910 A1 | 5/2016 | Ramanathan et al. |
| 2016/0156708 A1 | 6/2016 | Jalan et al. |
| 2016/0173579 A1 | 6/2016 | Jalan et al. |

FOREIGN PATENT DOCUMENTS

| | | |
|---|---|---|
| CN | 1449618 | 10/2003 |
| CN | 1473300 A | 2/2004 |
| CN | 1529460 | 9/2004 |
| CN | 1575582 | 2/2005 |
| CN | 1714545 A | 12/2005 |
| CN | 1725702 | 1/2006 |
| CN | 1910869 A | 2/2007 |
| CN | 101004740 A | 7/2007 |
| CN | 101094225 | 12/2007 |
| CN | 101163336 A | 4/2008 |
| CN | 101169785 A | 4/2008 |
| CN | 101189598 | 5/2008 |
| CN | 101247349 A | 8/2008 |
| CN | 101261644 A | 9/2008 |
| CN | 101442425 A | 5/2009 |
| CN | 0N101682532 A | 3/2010 |
| CN | 101946493 | 1/2011 |
| CN | 0N102123156 A | 7/2011 |
| CN | 102238226 | 11/2011 |
| CN | 102546590 | 7/2012 |
| CN | 102918801 | 2/2013 |
| CN | 103533018 A | 1/2014 |
| CN | 103944954 | 7/2014 |
| CN | 104796396 A | 7/2015 |
| CN | 102577252 B | 3/2016 |

(56) References Cited

FOREIGN PATENT DOCUMENTS

| | | |
|---|---|---|
| CN | 102918801 B | 5/2016 |
| CN | 102571742 B | 7/2016 |
| EP | 1209876 | 5/2002 |
| EP | 1770915 | 4/2007 |
| EP | 1885096 | 2/2008 |
| EP | 02296313 | 3/2011 |
| EP | 2577910 | 4/2013 |
| EP | 2760170 | 7/2014 |
| EP | 2772026 | 9/2014 |
| EP | 2760170 B1 | 12/2015 |
| IN | 261CHE2014 A | 7/2016 |
| JP | H09-097233 | 4/1997 |
| JP | 1999096128 | 4/1999 |
| JP | H11-338836 | 10/1999 |
| JP | 2000276432 A | 10/2000 |
| JP | 2000307634 A | 11/2000 |
| JP | 2001051859 A | 2/2001 |
| JP | 2001298449 A | 10/2001 |
| JP | 2002091936 A | 3/2002 |
| JP | 2003141068 A | 5/2003 |
| JP | 2003186776 A | 7/2003 |
| JP | 2005141441 A | 6/2005 |
| JP | 2006332825 A | 12/2006 |
| JP | 2008040718 A | 2/2008 |
| JP | 2013528330 | 5/2011 |
| JP | 5855663 B2 | 12/2015 |
| JP | 5906263 B2 | 4/2016 |
| JP | 5946189 B2 | 6/2016 |
| KR | 10-0830413 | 5/2008 |
| KR | 1020120117461 | 8/2013 |
| KR | 101576585 B1 | 12/2015 |
| KR | 101632187 | 6/2016 |
| TW | 269763 B | 2/1996 |
| TW | 425821 B | 3/2001 |
| TW | 444478 B | 7/2001 |
| WO | 01/13228 | 2/2001 |
| WO | 2001014990 | 3/2001 |
| WO | WO2001045349 | 6/2001 |
| WO | 2003103237 | 12/2003 |
| WO | WO2004084085 A1 | 9/2004 |
| WO | WO2006098033 A1 | 9/2006 |
| WO | 2008053954 | 5/2008 |
| WO | WO2008078593 A1 | 7/2008 |
| WO | 2011049770 | 4/2011 |
| WO | WO2011079381 A1 | 7/2011 |
| WO | 2012050747 | 4/2012 |
| WO | 2012075237 | 6/2012 |
| WO | 2013081952 | 6/2013 |
| WO | 2013096019 | 6/2013 |
| WO | 2013112492 | 8/2013 |
| WO | WO2014031046 A1 | 2/2014 |
| WO | 2014052099 | 4/2014 |
| WO | 2014088741 | 6/2014 |
| WO | 2014093829 | 6/2014 |
| WO | WO2014138483 | 9/2014 |
| WO | WO2014144837 | 9/2014 |
| WO | WO2014179753 | 11/2014 |
| WO | WO2015153020 A1 | 10/2015 |
| WO | WO2015164026 A1 | 10/2015 |

OTHER PUBLICATIONS

Hunt et al. NetDispatcher: A TCP Connection Router, IBM Research Report RC 20853 May 19, 1997.
Spatscheck et al., "Optimizing TCP Forwarder Performance", IEEE/ACM Transactions on Networking, vol. 8, No. 2, Apr. 2000.
Kjaer et al. "Resource allocation and disturbance rejection in web servers using SLAs and virtualized servers", IEEE on Transactions on Network and Service Management, IEEE, US, vol. 6, No. 4, Dec. 1, 2009.
Sharifian et al. "An approximation-based load-balancing algorithm with admission control for cluster web servers with dynamic workloads", The Journal of Supercomputing, Kluwer Academic Publishers, BO, vol. 53, No. 3, Jul. 3, 2009.
Koike et al., "Transport Middleware for Network-Based Control," IEICE Technical Report, Jun. 22, 2000, vol. 100, No. 53, pp. 13-18.
Yamamoto et al., "Performance Evaluation of Window Size in Proxy-based TCP for Multi-hop Wireless Networks," IPSJ SIG Technical Reports, May 15, 2008, vol. 2008, No. 44, pp. 109-114.
Abe et al., "Adaptive Split Connection Schemes in Advanced Relay Nodes," IEICE Technical Report, Feb. 22, 2010, vol. 109, No. 438, pp. 25-30.
Gite, Vivek, "Linux Tune Network Stack (Buffers Size) to Increase Networking Performance," nixCraft [online], Jul. 8, 2009 [retreived on Apr. 13, 2016], Retreived from the Internt: <URL:http://www.cyberciti.biz/faq/linux-tcp-tuning/>.
FreeBSD, "tcp—TCP Protocol," Linux Programmer's Manual [online], Nov. 25, 2007 [retreived on Apr. 13, 2016], Retreived from the Internet: <URL:https://www.freebsd.org/cgi/man.cgi?query=tcp&apropos=0&sektion=7&manpath=SuSE+Linux%2Fi386+11.0&format=asci>.
"Enhanced Interior Gateway Routing Protocol", Cisco, Document ID 16406, Sep. 9, 2005 update, 43 pages.
Crotti, Manuel et al., "Detecting HTTP Tunnels with Statistical Mechanisms", IEEE International Conference on Communications, Jun. 24-28, 2007, pp. 6162-6168.
Haruyama, Takahiro et al., "Dial-to-Connect VPN System for Remote DLNA Communication", IEEE Consumer Communications and Networking Conference, CCNC 2008. 5th IEEE, Jan. 10-12, 2008, pp. 1224-1225.
Chen, Jianhua et al., "SSL/TLS-based Secure Tunnel Gateway System Design and Implementation", IEEE International Workshop on Anti-counterfeiting, Security, Identification, Apr. 16-18, 2007, pp. 258-261.
"EIGRP MPLS VPN PE-CE Site of Origin (SoO)", Cisco Systems, Feb. 28, 2006, 14 pages.
Search Report dated Jul. 5, 2017 for Chinese Application No. 2014107207243.
Office Action dated Dec. 8, 2017 for Chinese Application No. 201410720724.3.

\* cited by examiner
† cited by third party

NETWORK PROXY LAYER FOR POLICY-BASED APPLICATION PROXIES

BACKGROUND

Field of the Invention

The present invention relates generally to data networks, and more particularly to policy based data networks.

Description of the Related Art

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Data networks such as the Internet, enterprise data networks, mobile broadband networks, cloud networks, have become an integral part of our lives. We use applications over data networks to obtain news, gather product information, reserve a table for dinner, submit a payment, purchase a good, read a book, find a map, make or receive phone calls, conduct or join a conferencing event, participate in a meeting, work on a document, approve a promotion, chat with a friend, watch television and videos, book a plane ticket, and do many other things in our normal lifestyle or work style. Corporate computers use applications over data network for business transactions, factory control, corporate voice and telephony services, inventory, fleet management and many other business uses.

Typically a client computer requests a service from a network application being served by a server computer. The communication session between the client computer and the server computer passes through a data network. Often, for security reasons and for load balancing purposes, network applications of certain types of communication sessions are inspected by the data network, for example, using a server load balancer (SLB), an application delivery controller (ADC), a firewall, a hypervisor application server or a media gateway. These communication sessions may include HTTP sessions, TCP sessions, and SIP sessions. In one example, a HTTP application desires to be inspected in the data network. An application proxy for the HTTP application will be deployed in a network device in the data network where the network device intercepts a communication session of the HTTP application between a client and a server serving the HTTP application. The HTTP application proxy receives data packets from the client, examines the client data, performs a TCP/IP layer security control, performs a HTTP protocol layer security control, performs additional security and service processing specific to the HTTP application, and finally sends the client data, perhaps modified based on the above mentioned processing, to the server. On the reverse path, the HTTP application proxy receives data from the server and applies similar processing before sending the server data, modified when necessary, to the client. The HTTP application proxy needs to handle any data buffer management, and any necessary security handling associated with the HTTP application and the underlying protocol layers.

In another example, a network device performs a SIP application proxy for a Voice Over IP (VoIP) and media application, where the network device provides security and traffic policy services to enhance the VoIP and media application.

Typically, each network application proxy behaves similarly in deployment. When the number of network application proxies deployed in a network device increases, there may be redundant effort in the handling of application proxies. Also, the handling of proxies among the different application proxies may be inconsistent, leading sometimes to undesirable behavior of the network device.

Thus, there is a need to provide a common network proxy layer to offer a consistent and efficient mechanism for network application proxies.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to approaches for providing a network proxy layer for policy-based application proxies. In embodiments of the invention, a common network proxy layer may be provided so that one or more network application proxies on that layer process data efficiently, and in the same manner.

In an exemplary method for providing a network proxy layer, the method may comprise receiving a connection establishment event for a client connection of an application session, and sending a client connection event to an application proxy for the application session, the application proxy associated to an application of a server. The method may further comprise receiving one or more data packets from the client connection, receiving a connection establishment event for a server connection of the application session to the server; and receiving one or more data packets from the server connection.

In further example embodiments of the present disclosure, the method steps are stored on a computer-readable medium comprising instructions, which when implemented by one or more processors perform the recited steps. In yet further example embodiments, hardware systems, or devices can be adapted to perform the recited steps. Other features, examples, and embodiments are described below.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

Figure 1:
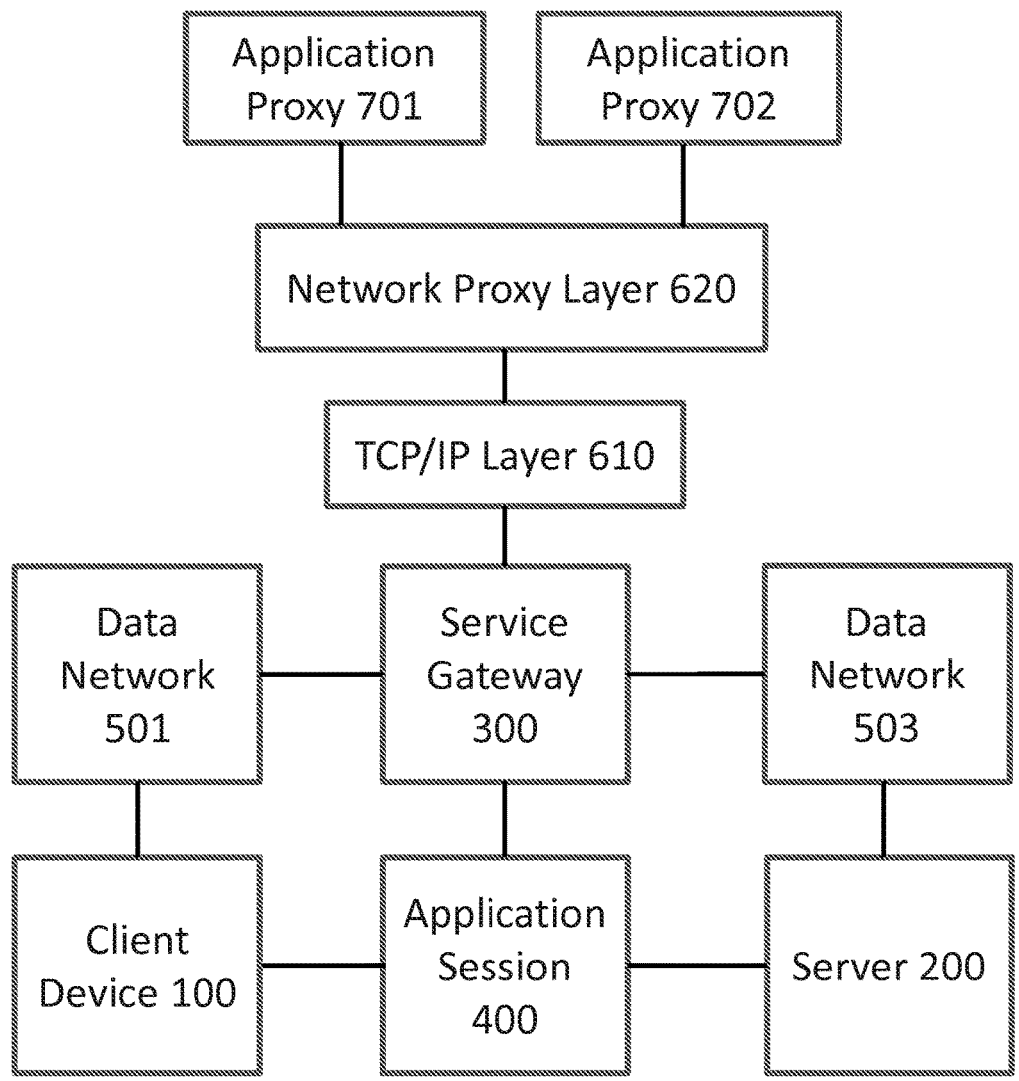
FIG. 1 illustrates an exemplary embodiment of a service gateway having a plurality of application proxies using a network proxy layer.

Referring now to the drawings, FIG. 1 illustrates a service gateway 300 servicing a plurality of application proxies 701, 702 using network proxy layer 620.

In an example embodiment, service gateway 300 connects to client device 100 over a data network 501. Data network 501 may comprise an Internet Protocol (IP) network, a corporate data network, a regional corporate data network, an Internet service provider network, a residential data network, a wired network such as Ethernet, a wireless network such as a WiFi network, or a cellular network. Data network 501 may reside in a data center, or connect to any other network or a cloud-based network.

In an example embodiment, service gateway 300 connects to server 200 over a data network 503. Data network 503 may comprise an Internet Protocol (IP) network, a corporate data network, a regional corporate data network, an Internet service provider network, a residential data network, a wired network such as Ethernet, a wireless network such as a WiFi network, or a cellular network. Data network 503 may reside in a data center, or connect to any other network or application network cloud. Data network 503 may also be the same as data network 501 in some embodiments.

Client device 100 is typically a computing device with network access capabilities. In example embodiments, client device 100 may be a workstation, a desktop personal computer, a laptop personal computer, a Personal Data Assistant (PDA), a tablet computing device, a smartphone, a cellular phone, a set-top box, an Internet media viewer, an Internet media player, a smart sensor, a smart medical device, a net-top box, a networked television set, a networked DVR, a networked Blu-ray player, a networked handheld gaming device, a media center, a mobile device, or a networked personal computing device.

In other embodiments, client device 100 may also be a residential broadband gateway, a business Internet gateway, a business computing server, a network customer premise device (CPE), or an Internet access gateway.

In exemplary embodiments, client device 100 may include a broadband remote access server (BRAS), a Digital Subscriber Line Access Multiplexer (DSLAM), a Cable Modem Terminating System (CMTS), or a service provider access gateway. Client device 100 may also include a mobile broadband access gateway such as a Gateway GPRS Support Node (GGSN), a Home Agent (HA), or a PDN Gateway (PGW).

In various embodiments, client device 100 may include a server load balancer, an application delivery controller, a traffic manager, a firewall, a VPN server, a remote access server, or an enterprise or datacenter access gateway. In one embodiment, client device 100 may be a device similar to service gateway 300.

In an exemplary method, client device 100 initiates application session 400 towards server 200 via service gateway 300.

Server 200 is a computing device typically coupled to a processor and a computer readable medium which stores computer readable program code. Server 200, with the processor and the computer readable program code, may implement the functionality of a Web server, a file server, a video server, a database server, an application server, a voice system, a conferencing server, a media gateway, a media center, an app server or a network server providing an application service to client device 100 using the application session 400. In one embodiment, server 200 may be a device similar to service gateway 300.

Figure 2:
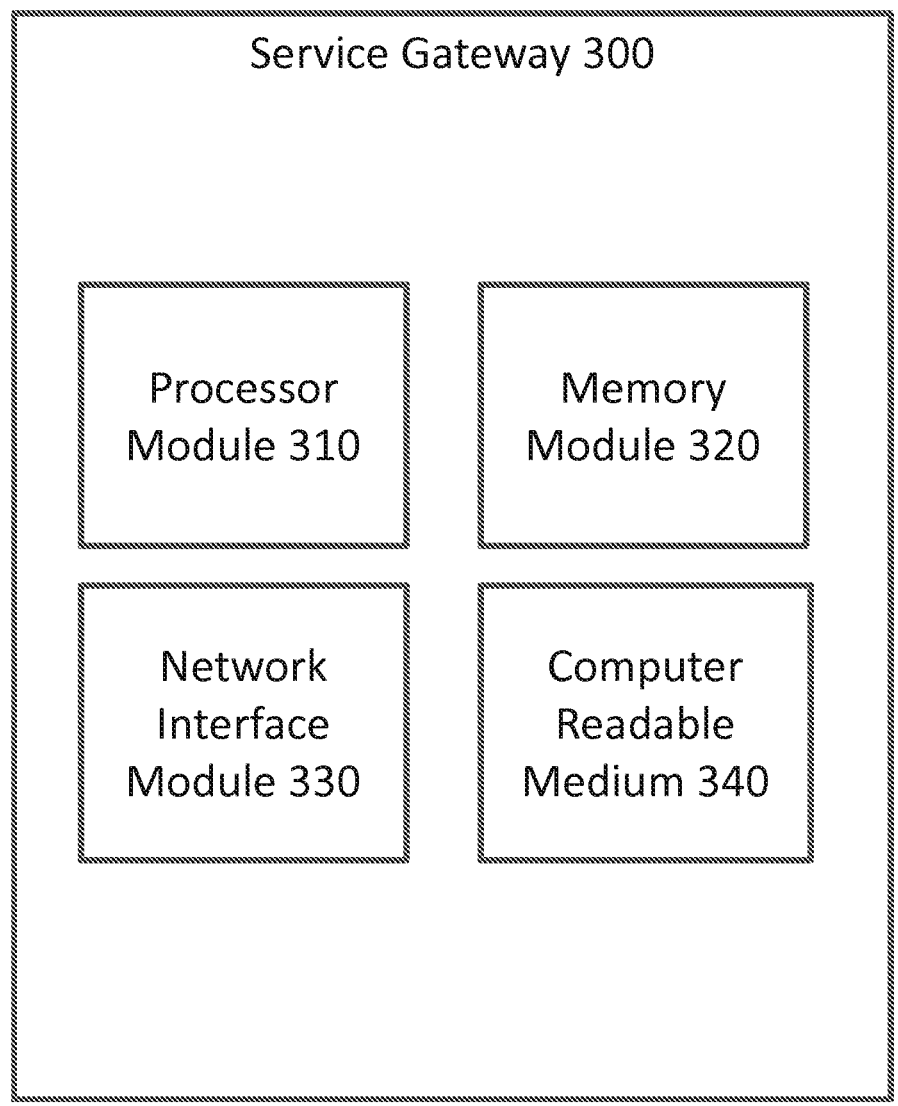
FIG. 2 illustrates components of an exemplary service gateway.

Service gateway 300, illustrated in FIG. 2, may be operationally coupled to a processor module 310, a memory module 320, a network interface module 330, and a computer readable medium 340. The computer readable medium 340 stores computer readable program code, which when executed by the processor module 310 using the memory module 320, may implement the various embodiments of the present invention as described herein. In some embodiments, service gateway 300 may be implemented as a server load balancer, an application delivery controller, a service delivery platform, a traffic manager, a security gateway, a component of a firewall system, a component of a virtual private network (VPN), a network proxy gateway, a network application server, a load balancer for video servers, a gateway to distribute load to one or more servers, a Web or HTTP server, a network address translation (NAT) gateway, or a TCP server.

Returning to FIG. 1, service gateway 300 may implement the functionality of TCP/IP layer 610, network proxy layer 620, and at least one application proxy, which may include application proxy 701 and/or application proxy 702. In one embodiment, network proxy layer 620 is implemented in network interface module 330 and network interface module 330 may include a network processor or an ASIC/FPGA circuitry capable of processing network proxy layer 620. In one embodiment, network proxy layer 620 is implemented in processor module 310.

Application session 400 may be a TCP session conducted via service gateway 300. In an exemplary embodiment, application proxy 701 processes application session 400. Service gateway 300 receives data packets of application session 400. TCP/IP layer 610 receives and processes the received application session 400 data packets and passes the processed data packets to network proxy layer 620. Network proxy layer 620 provides additional processing to the data packets and sends the processed data packets to application proxy 701. Upon processing the received application session 400 data packets, application proxy 701 may send responses based on the received application session 400 data packet to network proxy layer 620, which in turns processes the responses and sends to the TCP/IP layer 610, which further processes the received responses from network proxy layer 620 and transmits the results to client device 100 via data network 501 or server 200 via data network 503.

Application proxy 701 may relate to an application of server 200 serving application session 400.

Figure 3:
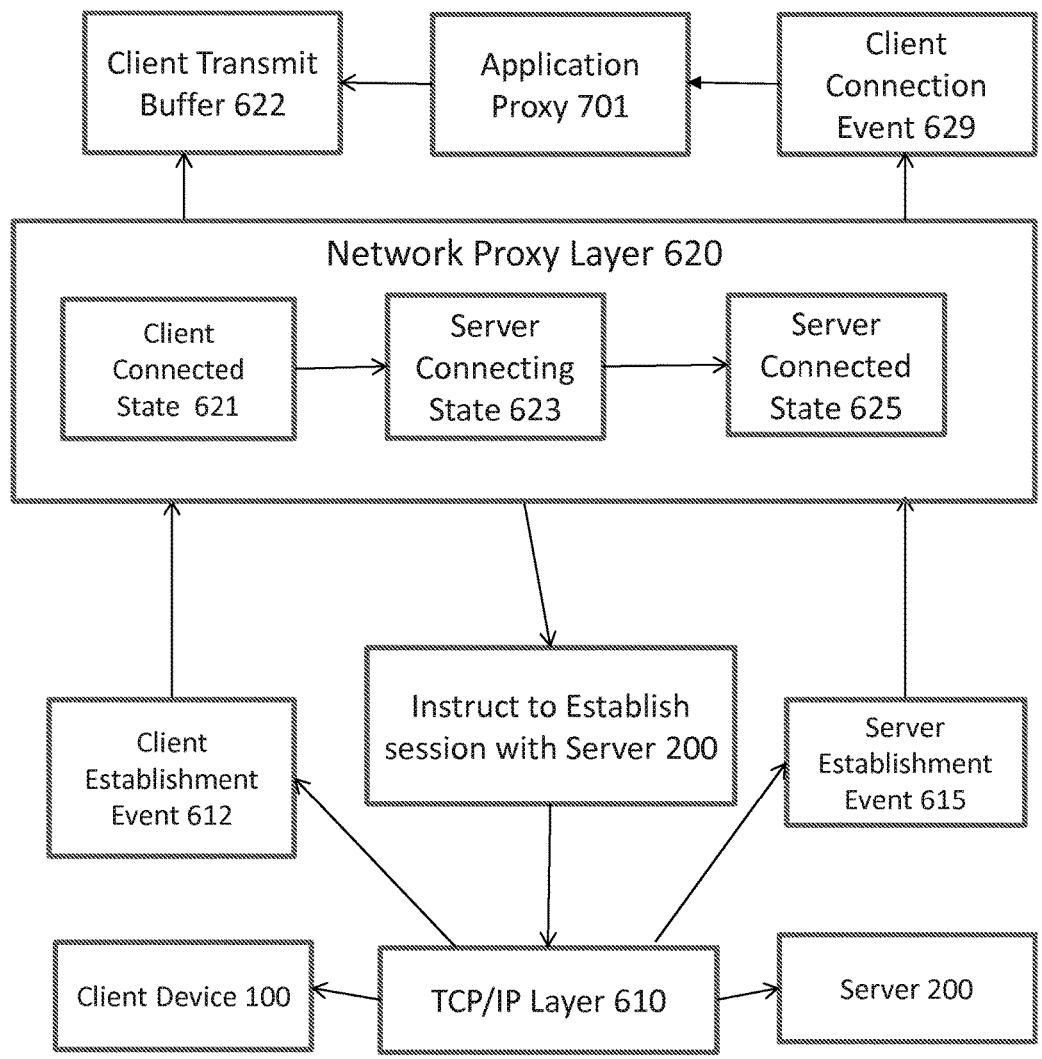
FIG. 3 illustrates an exemplary embodiment of a proxy state machine.

FIG. 3 illustrates an exemplary embodiment of network proxy layer 620. In one embodiment, network proxy layer 620 may include a state machine with three states—client connected state 621, server connecting state 623 and server connected state 625. In an example embodiment, network proxy layer 620 receives a client establishment event 612 from TCP/IP layer 610. Client establishment event 612 may be received when TCP/IP layer 610 exchanges or successfully establishes a TCP session connection with client device 100. Upon receiving client establishment event 612, network proxy layer 620 sets to client connected state 621.

In various embodiments, network proxy layer 620 may indicate the client establishment event 612 to application proxy 701. Network proxy layer 620 may send a client connection event 629 to application proxy 701 to indicate receipt of client establishment event 612. Client connection event 629 may include information about client device 100. Client connection event 629 may also include the TCP session connection with client device 100.

In one embodiment, network proxy layer 620 may include a client transmit buffer 622. Client transmit buffer 622 may store client data sent by application proxy 701 towards server 200. Client transmit buffer 622 will be further described below. In an example embodiment, network proxy layer 620 may determine that client transmit buffer 622 is not empty and has data to be transmitted to server 200 while network proxy layer 620 is in client connected state 621. Network proxy layer 620 may then change to server connecting state 623. Network proxy layer 620 may establish a TCP session with server 200. In one embodiment, network proxy layer 620 instructs TCP/IP layer 610 to establish a TCP session with server 200. In one embodiment, application proxy 701 informs network proxy layer 620 the address of server 200 for the TCP session. In one embodiment, the client transmit buffer 622 includes the server 200 address information.

Once TCP/IP layer 610 successfully establishes a TCP session with server 200, TCP/IP layer 610 may send a server establishment event 615 to network proxy layer 620. Upon receiving the server establishment event 615, network proxy layer 620 may change to server connected state 625. At the server connected state 625, service gateway 300 has a TCP session with client device 100 and a TCP session with server 200. Client device 100 and server 200 can exchange data packets for the application session 400 via service gateway 300.

Figure 4:
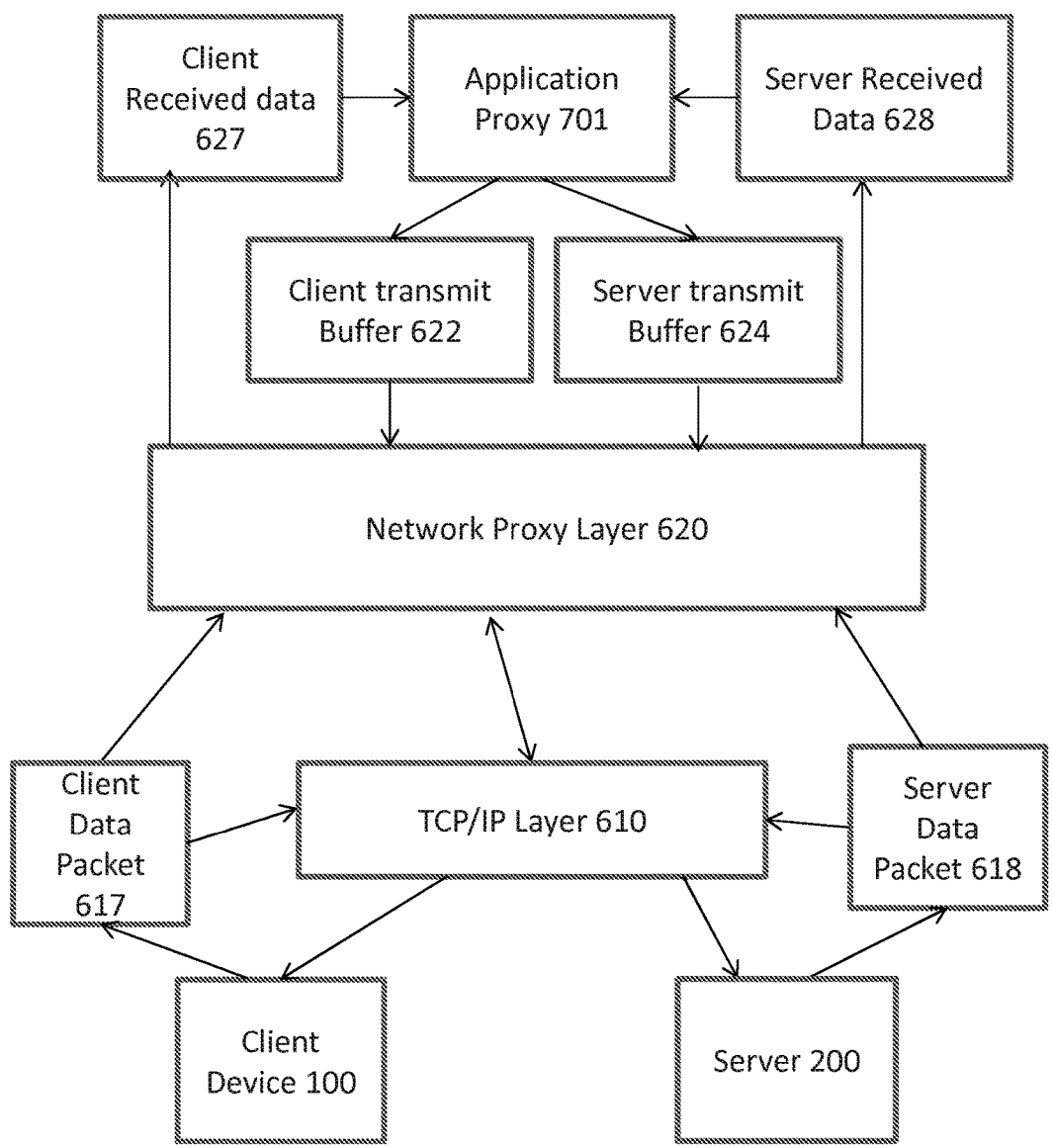
FIG. 4 illustrates an application proxy processing data packets exchanged over an application session in an exemplary embodiment.

FIG. 4 illustrates an example embodiment of data packets exchanged between client device 100 and server 200 where application proxy 701 processes the exchanged data packets.

In an example embodiment, network proxy layer 620 receives a client data packet 617 from client device 100 via TCP/IP layer 610. Network proxy layer 620 processes client data packet 617, generates client received data 627 using client data packet 617, and sends client received data 627 to application proxy 701. Network proxy layer 620 may also send client received data 627 to application proxy 701 after processing and combining one or more client data packets from client device 100. Furthermore, network proxy layer 620 may also perform one or more security checks or other policy based services on client data packet 617 prior to sending to application proxy 701. Network proxy layer 620 may also include a client connection event in client received data 627.

In one embodiment, application proxy 701 puts data into client transmit buffer 622. Application proxy 701 may also put data derived from client received data 627 into client transmit buffer 622. In one embodiment, application proxy 701 performs a proxy function on behalf of a corresponding application on server 200 serving application session 400. In various embodiments, application proxy 701 may also include information about server 200. In an example embodiment, application proxy 701 selects server 200 based on client received data 627. Application proxy 701 may include information about server 200 as a request to establish a session with server 200. Network proxy layer 620 may detect presence of data in client transmit buffer 622, and send the data in client transmit buffer 622 to server 200, via TCP/IP layer 610 onto the established server TCP session with server 200. The data in client transmit buffer 622 may include information about server 200. Network proxy layer 620 may use the server information to establish the server TCP session with server 200. Network proxy layer 620 may also establish the server TCP session with server 200 if the server TCP session is not present. In one embodiment, network proxy layer 620 establishes the server TCP session with server 200 if the information about server 200 differs from the existing server TCP session.

In an example embodiment, network proxy layer 620 receives a server data packet 618 from server 200 via TCP/IP layer 610. In one embodiment, network proxy layer 620 generates server received data 628 from server data packet 618 and sends server received data 628 to application proxy 701. Network proxy layer 620 may perform additional processing such as security or modification of server data packet 618 prior to generating server received data 628.

In exemplary embodiments, application proxy 701 may put data into server transmit buffer 624. Application proxy 701 may put data derived from server received data 628 into server transmit buffer 624. In one embodiment, application proxy 701 performs a proxy function on behalf of a service application on server 200 serving application session 400.

Network proxy layer 620 may also detect presence of data in server transmit buffer 624, and send the data in server transmit buffer 624 to client device 100, via TCP/IP layer 610 on the established client TCP session with client device 100.

Figure 5:
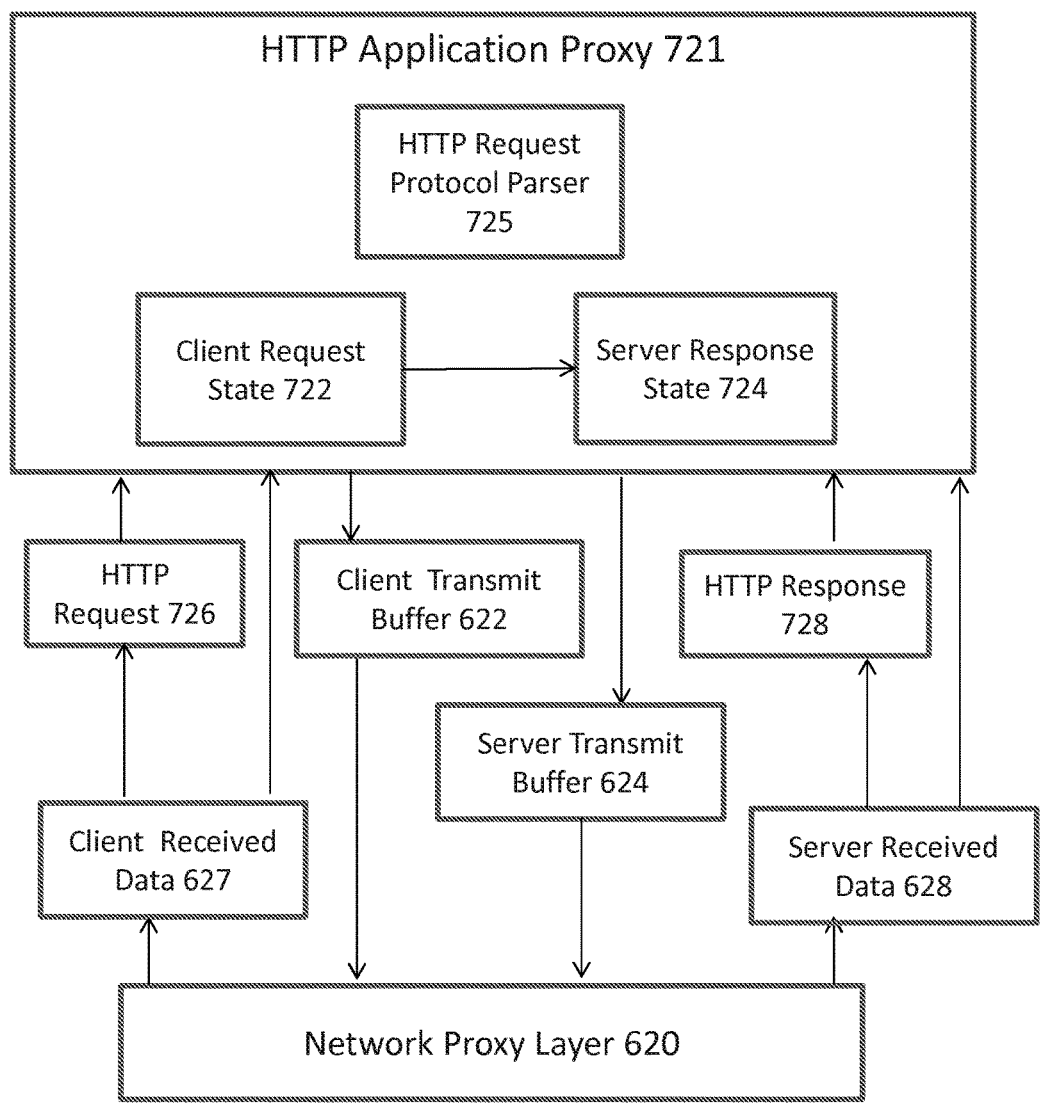
FIG. 5 illustrates an exemplary HTTP application proxy using a network proxy layer.

FIG. 5 illustrates an example embodiment of a HTTP application proxy 721. In exemplary embodiments, HTTP application proxy 721 may include a client request state 722 and a server response state 724. HTTP application proxy 721 may receive client received data 627 from network proxy layer 620. HTTP application proxy 721 determines client received data 627 is from client device 100. HTTP application proxy 721 may then set to client request state 722. HTTP application proxy 721 examines client received data 627 and determines client received data 627 includes a HTTP request 726.

In some embodiments, client request state 722 may include a HTTP request protocol parser 725 which determines if client received data 627 satisfies the HTTP request protocol. In an example embodiment, HTTP request protocol parser 725 determines that client received data 627 satisfies the protocol. HTTP request protocol parser 725 may generate a record showing the components of the HTTP request 726. HTTP application proxy 721 may then process HTTP request 726. In some embodiments, HTTP request protocol parser may be included in network proxy layer 620 and network proxy layer 620 processes client received data 627 against HTTP request protocol parser 725 to generate the record for the HTTP request 726. In some embodiments, client received data 627 may include the record for the HTTP request 726.

In an example embodiment, HTTP application proxy 721 may select server 200 based on HTTP request 726. HTTP application proxy 721 may also select server 200 based on a server selection policy (not shown). In exemplary embodiments, HTTP application proxy 721 may modify HTTP request 726 and put HTTP request 726 or the modified HTTP request into client transmit buffer 622. HTTP application proxy 721 may also inform network proxy layer 620 to establish a session with server 200 for HTTP request 726. As illustrated elsewhere, network proxy layer 620 may establish a TCP session with server 200 and transmit data in client transmit buffer 622 to server 200.

In exemplary embodiments, HTTP application proxy 721 may examine HTTP request 726 based on one or more security policies, such as detection of denial of service, or any other appropriate security policy application to HTTP protocol or the HTTP application associated to HTTP application proxy 721.

In an example embodiment, HTTP application proxy 721 changes state from client request state 722 to server response state 724. During server response state 724, HTTP application proxy 721 may receive server received data 628 from network proxy layer 620. Server response state 724 may continue to receive server received data 628. In server response state 724, HTTP application proxy 721 may inspect server received data 628 against HTTP response format. In server response state 724, it may generate a record showing the components of HTTP response 728. HTTP application proxy 721 may process HTTP response 728 or modify HTTP response 728. In some embodiments HTTP application proxy 721 mat process HTTP response 728 using a service policy. HTTP application proxy 721 may then place processed HTTP response onto server transmit buffer 624 for network proxy layer 620 to send to client device 100.

In embodiments, HTTP application proxy 721 may process HTTP response 728 based on one or more security policies such as detecting a phishing response, a virus or any other appropriate security policies application to HTTP response or the HTTP application associated to HTTP application proxy 721.

HTTP application proxy 721 may also perform load balancing for HTTP request 726, among a plurality of servers which includes server 200. In an exemplary embodiment, HTTP application proxy 721 performs a HTTP firewall function. In another exemplary embodiment, HTTP application proxy 721 performs an access control based on geographic information about client device 100. HTTP application proxy 721 may also perform content caching for server 200.

Figure 6:
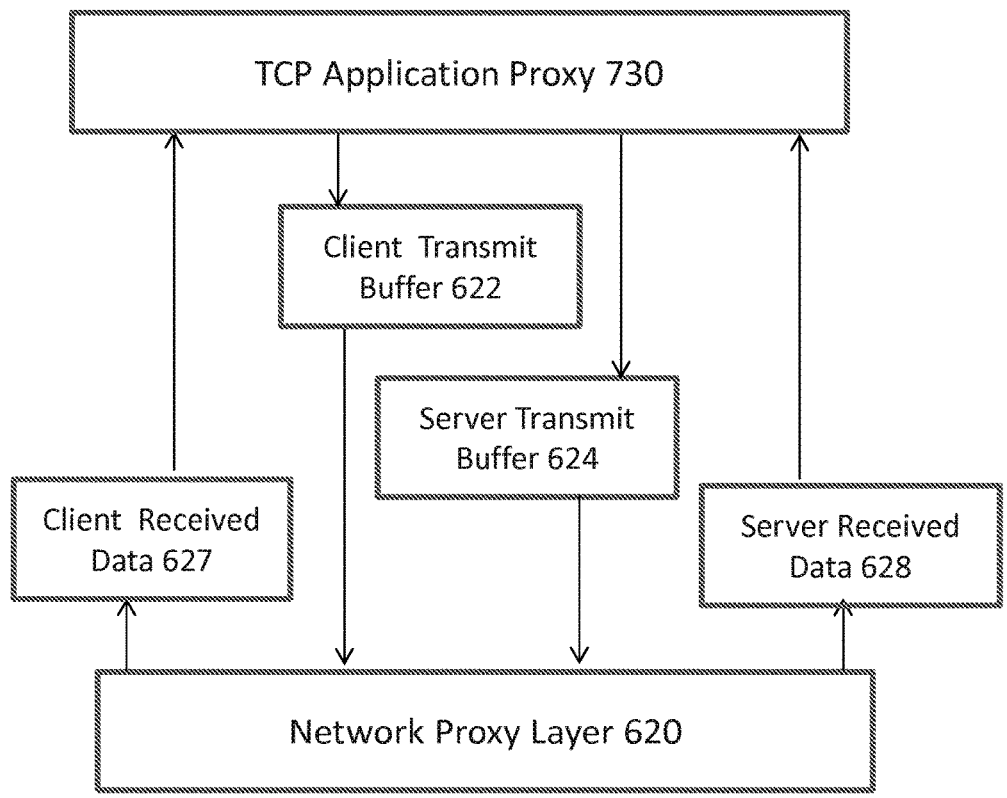
FIG. 6 illustrates an exemplary TCP proxy using a network proxy layer.

FIG. 6 illustrates an exemplary embodiment of a TCP application proxy 730. In exemplary embodiments, TCP application proxy 730 receives client received data 627 from network proxy layer 620. TCP application proxy 730 may place client received data 627 into client transmit buffer 622. If TCP application proxy 730 determines client received data 627 indicates a new TCP proxy session from client device 100, TCP application proxy 730 may inform network proxy layer 620 to establish a server session with server 200. TCP application proxy 730 may obtain server 200 information based on client received data 627.

In exemplary embodiments, TCP application proxy 730 receives server received data 628 from network proxy layer 620. TCP application proxy 730 may place server received data 628 into server transmit buffer 624.

In some embodiments, TCP application proxy 730 may process and perhaps modify client received data 627 or server received data 628 prior to placing the data into either client transmit buffer 622 or server transmit buffer 624. In one embodiment, TCP application proxy 730 processes client received data 627 or server received data 628 based on a security policy such as detection of a Denial of Service event (DOS), or other TCP security processing; or based on a service policy such as bandwidth policy, traffic management policy or other configured service policies. In one embodiment, TCP application proxy 730 applies additional session protocol processing such as encryption, decryption, compression, or TCP profiling.

Figure 7:
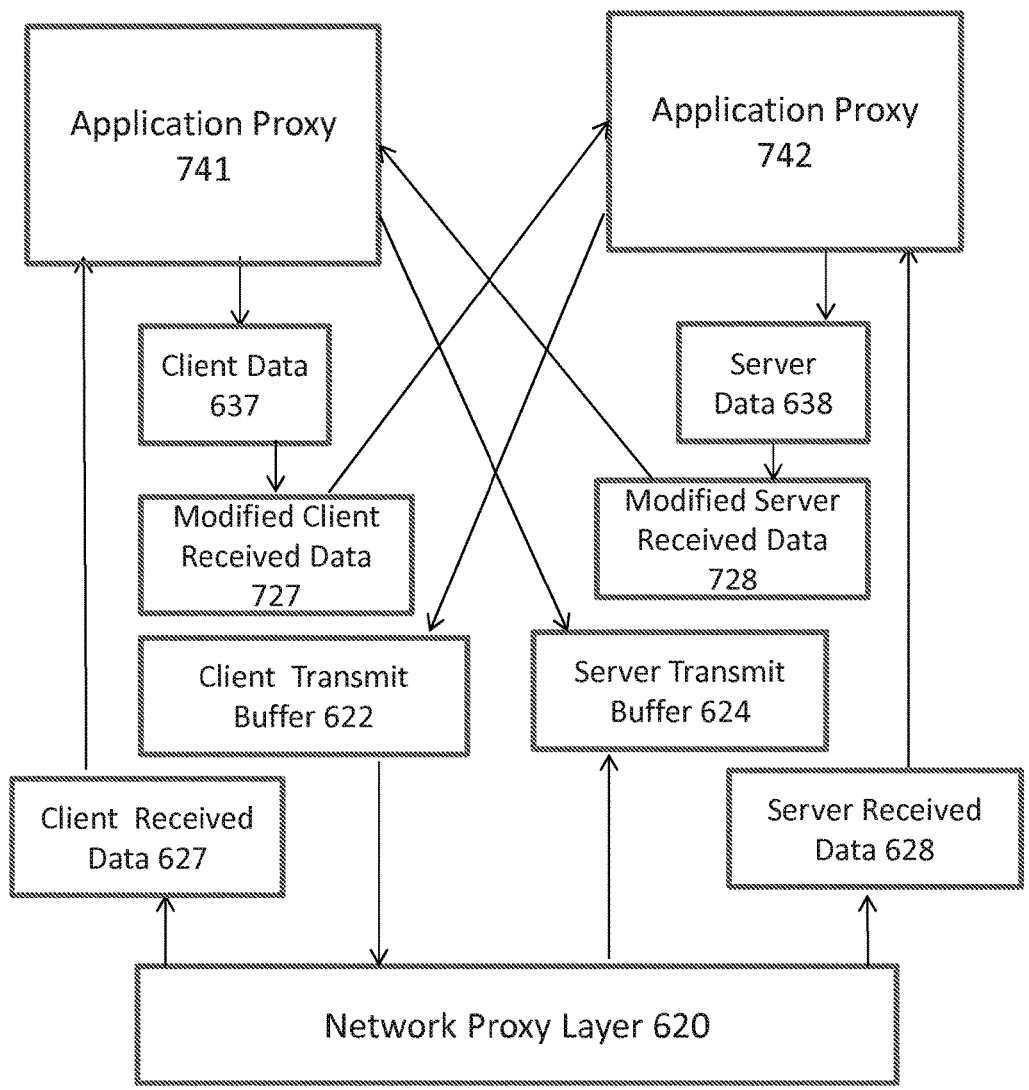
FIG. 7 illustrates a plurality of application proxies over an application session in an exemplary embodiment.

FIG. 7 illustrates an exemplary embodiment of a second application proxy 742 being applied after a first application proxy 741. In one embodiment, application session 400 is processed by two application proxies 741 and 742. In the client to server traffic direction, application proxy 741 may be applied before application proxy 742. In the server to client traffic direction, application proxy 741 may also be applied after application proxy 742. Alternatively, in some embodiments, application proxy 742 may be applied prior to application proxy 741 in the client to server traffic direction, and/or in the server to client traffic direction.

In an exemplary embodiment, application proxy 741 receives client received data 627, processes client received data 627, and generates client data 637 using client received data 627. In one embodiment, application proxy 741 places data 637 into client transmit buffer 622 and network proxy layer 620 sends client data 637 as modified client received data 727 for application proxy 742. In one embodiment, application proxy 741 sends data 637 as modified client received data 727 to application proxy 742. Application proxy 742 may process modified client received data 727 and place processed modified client received data 727 into client transmit buffer 622 such that network proxy layer 620 can send data from client transmit buffer 622 to server 200.

In exemplary embodiments, application proxy 742 may receive server received data 628, process server received data 628, and generates server data 638 using server received data 628. In one embodiment, application proxy 742 places server data 638 into server transmit buffer 624 and network proxy layer 620 places server data 638 from server transmit buffer 624 as modified server received data 728 for application proxy 741. In one embodiment, application proxy 742 sends server data 638 as modified server received data 728 to application proxy 741. Application proxy 741 processes modified server received data 728 and places processed modified server received data into server transmit buffer 624 such that network proxy layer 620 can send data from server transmit buffer 624 to client device 100.

Figure 8:
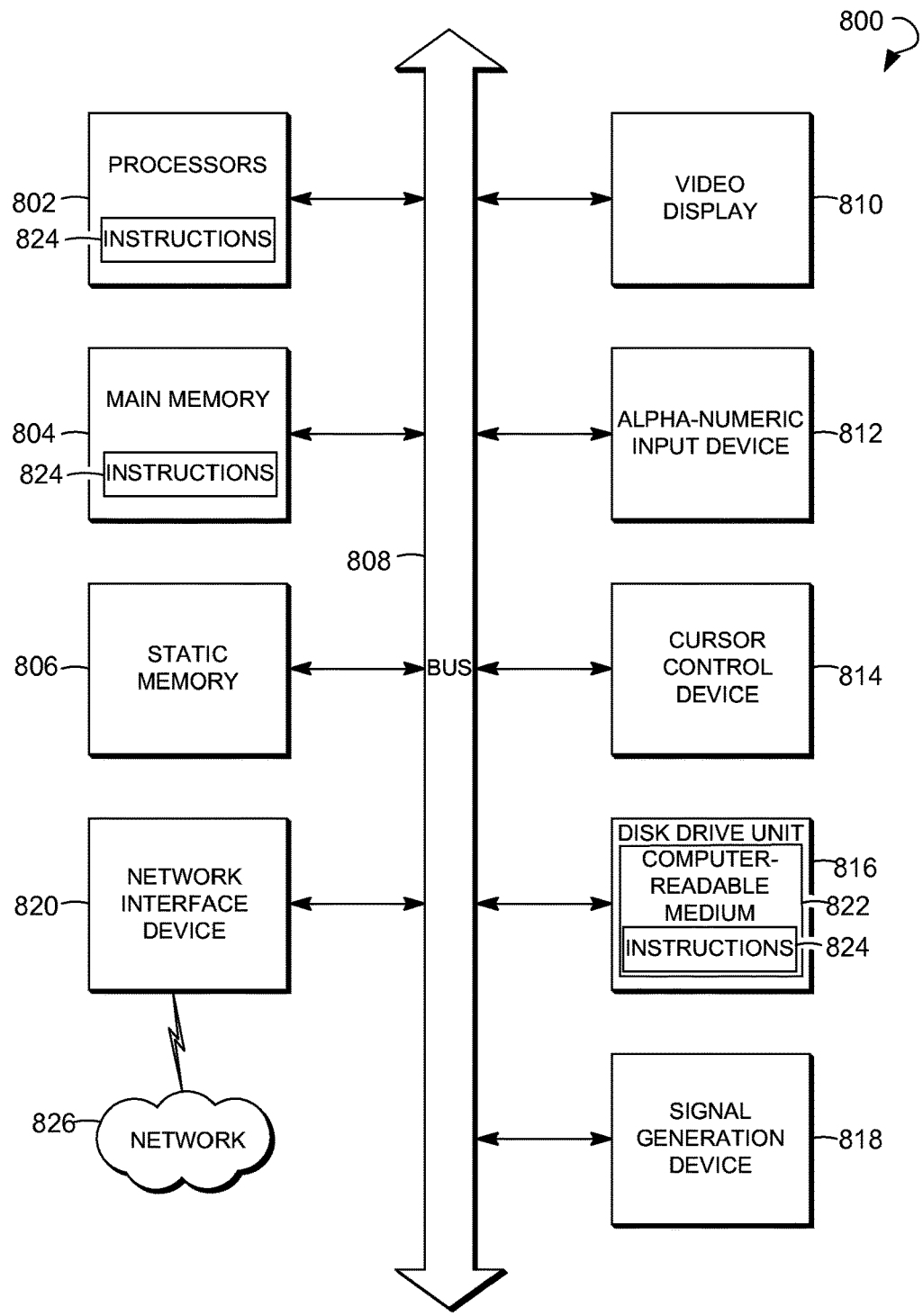
FIG. 8 illustrates a diagrammatic representation of a computing device for a machine in the example electronic form of a computer system, within which a set of instruc-

FIG. 8 shows a diagrammatic representation of a machine in the example electronic form of a computer system 800, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a PC, a tablet PC, a set-top box (STB), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor or multiple processors 802 (e.g., a central processing unit (CPU), a graphics processing unit (GPU), or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 may also include an alphanumeric input device 812 (e.g., a keyboard), a cursor control device 814 (e.g., a mouse), a disk drive unit 816, a signal generation device 818 (e.g., a speaker), and a network interface device 820.

The disk drive unit 816 includes a non-transitory computer-readable medium 822, on which is stored one or more sets of instructions and data structures (e.g., instructions 824) embodying or utilized by any one or more of the methodologies or functions described herein. The instructions 824 may also reside, completely or at least partially, within the main memory 804 and/or within the processors 802 during execution thereof by the computer system 800. The main memory 804 and the processors 802 may also constitute machine-readable media.

The instructions 824 may further be transmitted or received over a network 826 via the network interface device 820 utilizing any one of a number of well-known transfer protocols (e.g., Hyper Text Transfer Protocol (HTTP)).

While the computer-readable medium 822 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAMs), read only memory (ROMs), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Perl, UNIX Shell, Visual Basic or Visual Basic Script, Virtual Reality Markup Language (VRML), ColdFusion™ or other compilers, assemblers, interpreters or other computer languages or platforms.

Thus, methods and systems for providing a network proxy layer are disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for providing a network proxy layer, comprising:
   receiving, by a service gateway, a connection establishment event for a client connection of an application session, the connection establishment event indicating that the client connection is established between the service gateway and a client, the client connection being established based on a request received from the client;
   sending, by the service gateway, a client connection event to an application proxy for the application session upon receiving the connection establishment event for the client connection associated with the client, the application proxy being associated with an application of one or more of a plurality of servers, the client connection event including at least client data associated with the client, the application proxy storing the client data to a client transmit buffer based on the client connection event;
   receiving, by the application proxy, one or more data packets from the client connection;
   based on the client data the one or more data packets received from the client connection, and a server selection policy, selecting, by the application proxy, a server from the plurality of servers, the server being associated with server data;
   storing, by the application proxy, the one or more data packets and the server data of the server selected by the application proxy to the client transmit buffer;
   determining, by the service gateway, a presence of the one or more data packets in the client transmit buffer;
   based on the determining, initiating, by the service gateway, establishing a server connection of the application session with the server based on the server data stored in the client transmit buffer;
   receiving, by the service gateway, a server establishment event for the server connection of the application session to the server, the server establishment event indicating that the server connection is established between the service gateway and the server;
   upon receiving the server establishment event, sending, by the service gateway, the one or more data packets to the server based on the server data stored in the client transmit buffer; and
   receiving, by the application proxy, one or more data packets from the server connection.

2. The method of claim 1, wherein the receiving one or more data packets from the client connection further comprises:

sending a client data to the application proxy, the client data derived from the one or more data packets from the client connection.

3. The method of claim 1, wherein the receiving one or more data packets from the client connection further comprises:
processing the one or more data packets from the client connection based on a security or service policy.

4. The method of claim 1, wherein the receiving one or more data packets from the client connection further comprises:
processing the one or more data packets from the client connection based on a protocol format associated to the application proxy.

5. The method of claim 1, wherein the receiving the server establishment event for the server connection of the application session to the server comprises:
receiving a request for the server connection; and
establishing the server connection with the server upon receiving the request for the server connection.

6. The method of claim 5, wherein the receiving a request for the server connection comprises an address of the server.

7. The method of claim 6, wherein the establishing the server connection with the server upon receiving the request for the server connection is based on the address of the server.

8. The method of claim 1, wherein the receiving one or more data packets from the server connection further comprises:
sending a server data to the application proxy wherein the server data is derived from the one or more data packets from the server connection.

9. The method of claim 1, wherein the receiving one or more data packets from the server connection further comprises:
processing the one or more data packets from the server connection based on a security or service policy.

10. The method of claim 1, wherein the receiving one or more data packets from the server connection further comprises:
processing the one or more data packets from the server connection based on a protocol format associated to the application proxy.

11. The method of claim 1, further comprising:
receiving client transmit data from the application proxy; and sending the client transmit data to the server connection.

12. The method of claim 11, wherein the client transmit data is sent to the server connection as one or more data packets.

13. The method of claim 1, further comprising:
receiving server transmit data from the application proxy; and sending the server transmit data to the client connection.

14. The method of claim 13, wherein the server transmit data is sent to the client connection as one or more data packets.

15. The method of claim 1, wherein the client connection or the server connection is an TCP connection.

16. The method of claim 1, wherein the application is one of a TCP application, a secure TCP application, a HTTP application, a secure HTTP application, a SIP application, or a secure SIP application.

17. A non-transitory computer-readable storage medium having instructions stored thereon, the instructions being executable by one or more processors to perform a method for providing a network proxy layer, the method comprising:

receiving, by a service gateway, a connection establishment event for a client connection of an application session, the connection establishment event indicating that the client connection is established between the service gateway and a client, the client connection being established based on a request received from the client;
sending, by the service gateway, a client connection event to an application proxy for the application session upon receiving the connection establishment event for the client connection associated with the client, the application proxy being associated with an application of one or more of a plurality of servers, the client connection event including at least client data associated with the client, the application proxy storing the client data to a client transmit buffer based on the client connection event;
receiving, by the application proxy, one or more data packets from the client connection;
based on the client data, the one or more data packets received from the client connection, and a server selection policy, selecting, by the application proxy, a server from the plurality of servers, the server being associated with server data;
storing, by the application proxy, the one or more data packets and the server data of the server selected by the application proxy to the client transmit buffer;
determining, by the service gateway, a presence of the one or more data packets in the client transmit buffer;
based on the determining, initiating, by the service gateway, establishing a server connection of the application session with the server based on the server data stored in the client transmit buffer;
receiving, by the service gateway, a server establishment event for the server connection of the application session to the server, the server establishment event indicating that the server connection is established between the service gateway and the server;
upon receiving the server establishment event, sending, by the service gateway, the one or more data packets to the server based on the server data stored in the client transmit buffer; and receiving, by the application proxy, one or more data packets from the server connection.

18. The non-transitory computer-readable storage medium of claim 17, wherein the receiving one or more data packets from the client connection further comprises:
sending a client data to the application proxy, the client data derived from the one or more data packets from the client connection.

19. The non-transitory computer-readable storage medium of claim 17, wherein the receiving one or more data packets from the client connection further comprises:
processing the one or more data packets from the client connection based on a security or service policy.

20. The non-transitory computer-readable storage medium of claim 17, wherein the receiving one or more data packets from the client connection further comprises:
processing the one or more data packets from the client connection based on a protocol format associated to the application proxy.

21. The non-transitory computer-readable storage medium of claim 17, wherein the receiving the server establishment event for the server connection of the application session to the server comprises:
receiving a request for the server connection; and
establishing the server connection with the server upon receiving the request for the server connection.

22. The non-transitory computer-readable storage medium of claim 21, wherein the receiving a request for the server connection comprises an address of the server.

23. The non-transitory computer-readable storage medium of claim 22, wherein the establishing the server connection with the server upon receiving the request for the server connection is based on the address of the server.

24. The non-transitory computer-readable storage medium of claim 17, wherein the receiving one or more data packets from the server connection further comprises:
sending a server data to the application proxy wherein the server data is derived from the one or more data packets from the server connection.

25. The non-transitory computer-readable storage medium of claim 17, wherein the receiving one or more data packets from the server connection further comprises:
processing the one or more data packets from the server connection based on a security or service policy.

26. The non-transitory computer-readable storage medium of claim 17, wherein the receiving one or more data packets from the server connection further comprises:
processing the one or more data packets from the server connection based on a protocol format associated to the application proxy.

27. The non-transitory computer-readable storage medium of claim 17, further comprising:
receiving client transmit data from the application proxy; and sending the client transmit data to the server connection.

28. The non-transitory computer-readable storage medium of claim 27, wherein the client transmit data is sent to the server connection as one or more data packets.

29. The non-transitory computer-readable storage medium of claim 17, further comprising:
receiving server transmit data from the application proxy; and sending the server transmit data to the client connection.

30. The non-transitory computer-readable storage medium of claim 29, wherein the server transmit data is sent to the client connection as one or more data packets.

31. The non-transitory computer-readable storage medium of claim 17, wherein the client connection or the server connection is an TCP connection.

32. The non-transitory computer-readable storage medium of claim 17, wherein the application is one of a TCP application, a secure TCP application, a HTTP application, a secure HTTP application, a SIP application, or a secure SIP application.

* * * * *